July 16, 1929.  T. S. JONES  1,720,731
DYNAMO ELECTRIC MACHINE
Filed April 7, 1928
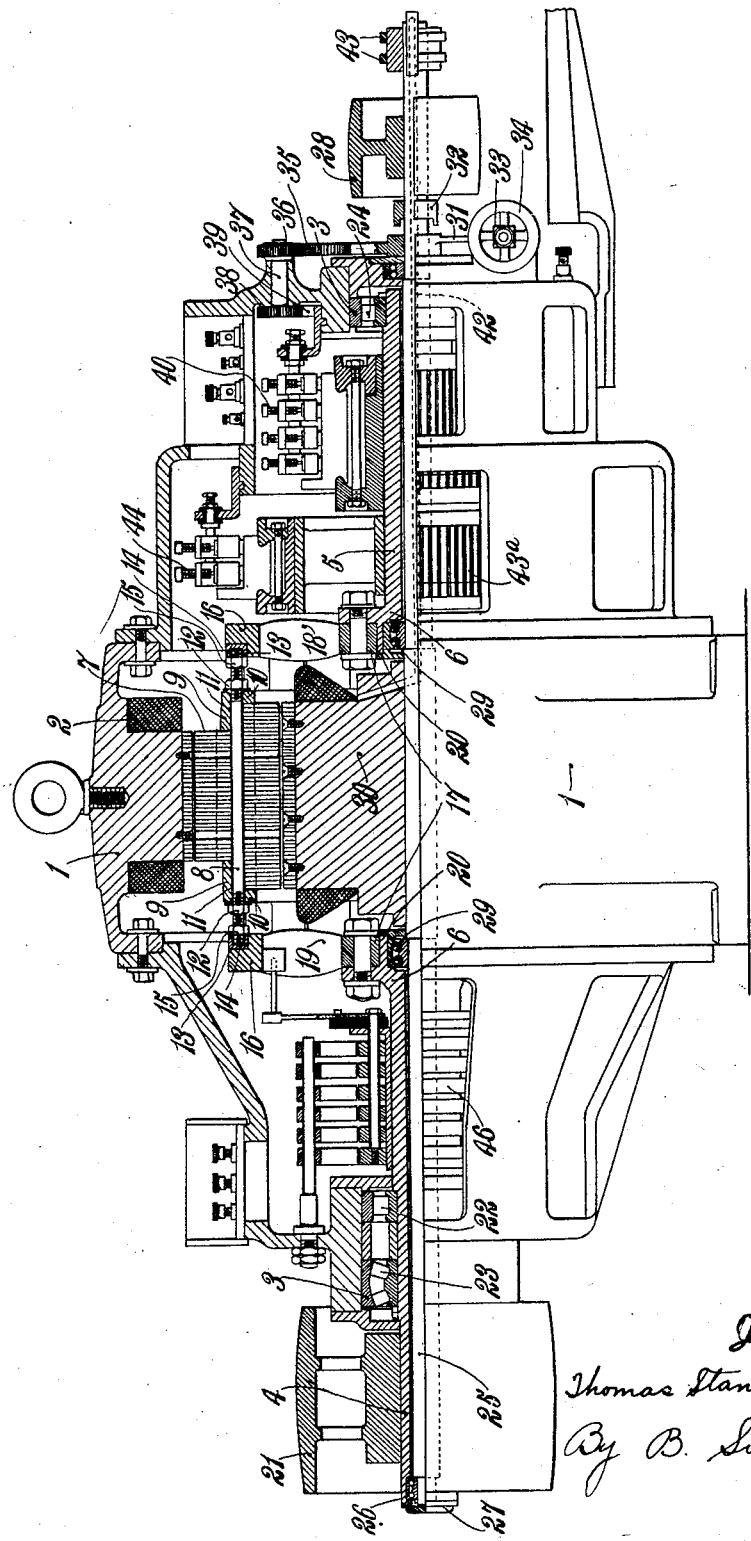
Inventor
Thomas Stanley Jones
By B. Singer
Atty.

Patented July 16, 1929.

1,720,731

UNITED STATES PATENT OFFICE.

THOMAS STANLEY JONES, OF NEWPORT, ENGLAND.

DYNAMO-ELECTRIC MACHINE.

Application filed April 7, 1928, Serial No. 268,262, and in Great Britain March 7, 1927.

Applications have been filed in Great Britain, March 7, 1927, No. 293,475 and in Germany, May 7, 1928.

This invention relates to dynamo-electric machines of the type comprising a hollow cylindrical armature working in conjunction with exterior and interior field magnet pole or winding systems, and has for its objects to provide such machines of great efficiency and utility to act as generators of D. C. or A. C. or both, of any desired phase, and to function as a motor if desired.

In dynamo electric machines of the above type, in some cases it has been proposed to drive the interior pole or winding system to rotate in the interior of the hollow cylindrical armature; in other cases it has been proposed to hold the interior pole or winding system fixed, but capable of slight angular adjustment to vary the relative positions of the two pole systems, and such adjustment has been effected by means of worm and worm wheel gearing. In both cases the interior pole or winding system is mounted upon a center shaft, and the cylindrical armature is carried by two hollow shafts that surround and provide bearings for the center shaft, the said hollow shafts themselves being mounted in bearings on a frame or casing of the machine.

According to the present invention, a dynamo electric machine of the above type and in which the interior field magnet, pole or winding system is adapted to be driven to rotate in the interior of the hollow cylindrical armature is characterized by the provision of means whereby the machine may be operated with the interior field magnet, pole or winding system fixed in relation to the exterior field and preferably angularly adjustable with respect to such field for the purposes hereinafter fully set forth.

Means such as a worm and worm wheel are provided for adjusting the position of the interior pole system when the latter is held from rotation and to enable this to be brought into and out of action clutching means of suitable type may be furnished.

Suitable commutators, slip rings and the like are provided to which the windings are connected and in some cases more than one commutator may be provided connected to the same windings.

In order that the invention may be better understood, it will now be described with reference to the accompanying drawing, the single view of which shews an elevation with the upper half in section of one form of machine constructed according to the invention.

The particular machine shewn in the drawing comprises an exterior casing 1 formed in any desired number of parts and having the exterior pole or winding system 2 combined therewith in any desired and usual manner. This casing at the ends is formed with housings for the bearings 3 of hollow shafts 4 and 5 which extend therethrough into the interior of the casing. These shafts come in alignment and end in flanged housings 6 to be hereafter referred to.

The windings of the cylindrical armatures are omitted from the drawing for clearness, but this cylindrical armature 7 is built up from a desired number of laminated rings suitably insulated and of desired shape. These laminated rings when bolted together form a desired number of slots both on the interior and exterior for the windings of the armature. The laminations are held together as a block by a number of clamping rods or bolts 8 passing therethrough. These rods are arranged parallel to the axis of the shaft and at the ends are carried by ring shaped end shields 9 which are formed or provided with an inwardly projecting flange 10 to come over the outer laminations. The rods are covered by a sleeve 11 of insulating material and the ends of the rods are screw threaded for the reception of nuts 12. These nuts clamp against the flanges 10 of the end shields, an insulating washer coming between the nuts and the shields. The ends of the rods project beyond these nuts and are located in grooves or recesses 13 in ring-like members 14 of the end shields which are spaced from the flange 10 before mentioned by a suitably lightened portion of the end shields as shewn. Other nuts 15 are screwed on to the ends of the rods 8 before they are located in position in the grooves or recesses 13 before referred to and afterwards the nuts 15 are screwed towards the ends of the rods to lock the rods in position by binding against the inner surfaces of the said ring-like members 14 as shewn.

The cylindrical member thus built up comprising the laminations, end shields and clamping rods is carried by two end spiders each comprising an outer ring portion 16 attached by suitable screws or bolts (not shewn) to the end shield and an inner apertured boss 17 which fits over an inwardly extending portion 20 of the hollow shaft 4 or 5 before referred to and is adapted to be attached to the flange of the said hollow shaft as shewn. The outer rings 16 of the spiders and the inner apertured bosses 17 are connected by suitable and somewhat radial arms 18 and at one or both ends these arms may be constituted by vane-like blades such as 19 for cooling purposes. The end shields are made from non-magnetic metal to magnetically isolate the armature core.

It will be appreciated that the hollow cylindrical armature 7 is carried by the two hollow shafts 4 and 5 in bearings 3 at the ends of the casing. One of these shafts 4 projects beyond the associated bearing 3 and has suitably keyed thereto a pulley or the like 21 of desired diameter for driving the armature 7. The bearings for carrying the hollow shafts may be roller bearings, ball bearings or otherwise or may be self-aligning bearings of any desired nature. The end adjacent the driving pulley 21 as shewn has both roller bearings 22 and self-aligning bearings 23, whilst the end of the shaft 5 remote from the drive if desired may simply as shewn have a roller bearing 24.

Another shaft 25 extends completely across the machine and passes through the hollow portion of the two hollow shafts 4 and 5. At the end of the hollow shaft 4 which carries the driving pulley 21, this inner shaft 25 is reduced and mounted in self-aligning bearings 26 carried by the end of the hollow shaft 4. A cap 27 closes in these bearings 26 and the end of the hollow shaft 4. At the other end the inner shaft 25 projects beyond the open end of the hollow shaft 5 and has mounted thereon a driving pulley 28 and other turning means as hereafter explained.

The two flanged ends of the hollow shafts 4 and 5 are formed as housings and carry therein suitable ball, roller or other bearings 29 for supporting the other shaft 25 which passes therethrough and the portion of the shaft coming between these bearings has mounted thereon the inner pole or winding system 30 which extends to the hollow cylindrical armature 7.

The portion of this inner shaft 25 which extends beyond the casing and has the driving pulley 28 mounted thereon also carries a portion of a worm wheel 31 loosely mounted thereon but adapted to be clutched thereto by a suitable clutch member 32 slidable on but rotatable with the shaft 25. The worm wheel 31 meshes with a suitable worm (not shewn) the spindle 33 of which is carried in suitable bearings. The worm spindle is operated from a suitable hand wheel 34. A toothed quadrant 35 moves with the worm wheel portion 31 and this toothed quadrant 35 meshes with a pinion 36 carried on a shaft 37 projecting through the casing 1, the other end of the shaft 37 coming on the interior of the casing and carrying another pinion 38 meshing with a suitably supported ring 39 having a desired number of teeth, the ring being connected by suitable means to the brushes 40 working on a suitable commutator 41. By this means when the worm wheel 31 is operated the brushes 40 receive a corresponding movement.

In the operation of the machine it will be understood that if required the hollow cylindrical armature 7 only can be driven, the outer field system 2 being fixed owing to the construction and the inner field 30 carried by the inner shaft 25 also remaining fixed. When used in this manner the inner field system can be adjusted by the worm and worm wheel gearing to bring the inner pole system 30 in a desired position with respect to the outer pole system 2. The current generated when the machine is working in this manner can be suitably collected from the commutator 41, or in the case of an A. C. machine, from suitable slip rings. The machine can be used as a motor or prime mover.

In some cases the inner field 30 may be driven from the pulley or the like 28 carried by the shaft 25 to which the inner field system is fixed. In this case it is of course appreciated that the worm mechanism is unclutched before the driving is commenced. The inner pole system is driven round at any desired speed and this causes the hollow cylindrical armature 7 also to be driven, the speed of rotation of the latter being somewhat less than that of the inner rotating field system. When thus driven both A. C. and D. C. currents can be collected from suitable slip rings, commutators and the like and if required torque can be taken from the pulley 21 on the armature shaft 4.

The rotary induction or magnetic drive imparted to the rotary armature enables a large power machine to be started up at a minimum current, thus working in a reverse manner to ordinary practice. As the field current increases the speed of the armature 7 also increases, lagging behind the interior rotor poles or winding system 30 according to the strength of the field current and the speed of the interior pole system.

One of the advantages of this slow starting up for generators is that a constant pressure of current is maintained at peak, or variable or overloads, as the magnetic drive absorbs the shock without affecting the primary side.

In other cases the armature 7 may be prevented from turning while the inner pole system 30 is being rotated and this gives another result. It will further be seen that the hollow cylindrical armature 7 can be driven whilst the inner pole system 30 is also being driven and either in the same or opposite direction and at the same or different speeds. Varied results will of course be obtained by these varied methods of driving.

The leads to the inner pole system 30 may pass thereto through the hollow portion 42 of the inner shaft 25 and are connected to suitable slip rings 43 or to a commutator working in combination with brushes or the like.

The different methods of using the machine enable it to be used in generating A. C. or D. C. current under different conditions and for this purpose more than one commutator and associated brushes, slip rings or the like may be utilized for collecting the current. An additional commutator 43ª and brushes 44 are shewn in the drawings as well as slip rings 46 to enable this machine to be used in various circumstances.

The combined machine is of particular use where a series of machines functioning in different manners may be required at different times, for example for testing purposes, in a technical laboratory, school or the like. For this purpose a complete combined machine with all the possible variations of action as before described may be constructed.

What I claim and desire to secure by Letters Patent of the United States of America is:—

1. In a dynamo electric machine of the type comprising an outer casing, an exterior field magnet system carried in the said casing, a hollow cylindrical armature surrounded by the said exterior field magnet system, hollow shafts carrying the said armature, driving means in connection with one of the hollow shafts, bearings connected to the casing for supporting the said hollow shafts, an interior field magnet system located within the hollow cylindrical armature, shafts carrying said interior field magnet system, the said shafts having supporting bearings carried by the hollow shafts which carry the cylindrical armature, one of said shafts projecting beyond its associated hollow shaft, and a driving pulley mounted on said projecting shaft, a construction including a worm wheel loosely mounted on the driving shaft of the interior field magnet system, clutch means for coupling the worm wheel to the said shaft when it is required to hold the interior field magnet system from rotation, a worm meshing with the said worm wheel, a shaft carrying the worm, and a hand wheel for turning the shaft to adjust the angular position of the interior field magnet system with relation to the exterior field system when the worm wheel is coupled to the said shaft.

2. A dynamo electric machine as claimed in claim 1, in which the cylindrical armature comprises laminated rings, end shields at the ends of the armature, rods passing through the laminated rings and end shields, nuts threaded on said rods to clamp the end shields and laminated rings together, spiders arranged beyond the end shields and having arms connected to the hollow shafts, and connections between the spiders and the said rods.

In witness whereof I affix my signature.

THOMAS STANLEY JONES.